Dec. 1, 1931.  E. B. SISSON  1,833,919
FILTER
Filed Nov. 13, 1930
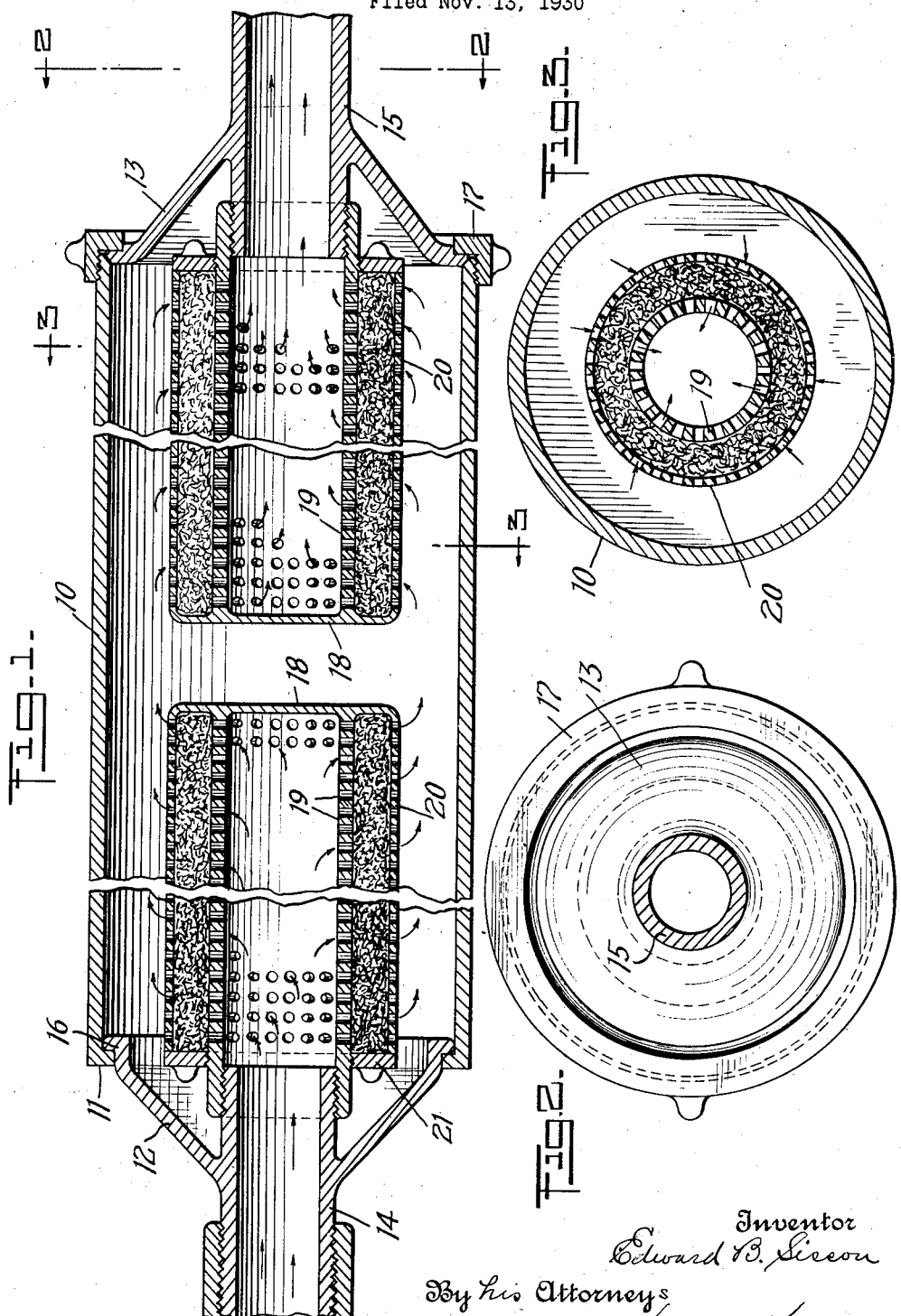
Inventor
Edward B. Sisson
By his Attorneys
Kenyon & Kenyon Patented Dec. 1, 1931

1,833,919

UNITED STATES PATENT OFFICE

EDWARD B. SISSON, OF NEW YORK, N. Y., ASSIGNOR OF TWO-FIFTHS TO ALBERT W. GINN, OF NEW YORK, N. Y.

FILTER

Application filed November 13, 1930. Serial No. 495,358.

This invention relates to filters and more especially pertains to a filter particularly adapted for removing dirt and other particles from air, gas or other fluid medium.

An object of this invention is a simple, inexpensive and highly efficient filter which may be easily opened for the replacing, cleaning, repacking and/or sterilizing of the filter units.

A filter embodying this invention is particularly adapted for use in cleaning air supplied from a pump to the interior of a milk tank car for the purpose of applying pressure to the milk or other fluid foodstuffs to force the same out of the tank. This filter comprises a casing having end sections provided with inlet and outlet pipes which constitute part of the line leading from the outlet of the pump to the tank. In the casing are provided a pair of filtering units, each being connected to the end of a pipe so that the air or fluid to be cleaned is caused to pass successively through these cups. Each filtering unit comprises a double-wall cup, and between the two walls of each cup there is provided a filling of filtering material, the walls being perforated to permit the passage of air through the filtering material. The lateral wall of the casing is so associated with the end sections that it can easily be disconnected and moved axially in order to give access to the filter units.

Other objects, novel features and advantages of this invention will be apparent from the following specification and accompanying drawings, wherein:

Fig. 1 is a longitudinal section through an embodiment of the invention;

Fig. 2 is a section on the line 2—2 of Fig. 1, and

Fig. 3 is a section on the line 3—3 of Fig. 1.

The casing for the filter comprises a cylinder 10 having an inwardly directed flange 11 at one end and a pair of end members or caps 12 and 13 which are provided with pipe sections 14 and 15 threaded at their inner ends. The cap 12 is provided with a flange 16 which is engaged by the flange 11, while a screw threaded clamping member 17 is rotatably supported by the cap 13 and is threaded onto the other end of the cylinder 10. The member 17 clamps the flanges 11 and 16 in contact as well as the bevel surfaces of the cylinder 10 and end member 13, thereby sealing the casing. The pipe sections 14 and 15 are suitably connected with other pipes constituting a conduit leading from the outlet of a pump to the interior of a tank car, or the like. By unscrewing the member 17, the sleeve 10 is released and can be moved axially to permit access to the filter units later to be described.

A filtering unit 18 is threaded onto the inner end of each pipe section 14 and 15, this filter unit comprising a cup-shaped member having concentric perforated walls 19 and 20. The inner wall 19 extends beyond the outer wall 20 and is interiorly threaded to screw onto the threads on the pipe section 14 or 15. An annular cap 21 is threaded onto the outer surface of the extended end of the inner wall 19 and serves to close the annular space between the two walls. A body of suitable fibrous filtering material or the like is interposed between the two walls and is held in place by the cap 21.

When it is desired to refill or replace the filtering units, the sleeve 10 is released and moved to the left, after which the filtering units are disconnected from the pipe sections by unscrewing the same. Fresh filtering units may be screwed on to the pipe sections, the caps 21 may be removed and the filtering material drawn out and new filtering material substituted, after which the units may be screwed onto the ends of the pipe sections and the sleeve 10 returned to its original position and clamped by the member 17.

The filtering units are relatively simple and inexpensive to manufacture and the entire filter comprises a minimum number of parts in a sanitary, quickly and easily demountable arrangement. The various parts are made rugged so as to withstand hard usage and there is nothing about the filter which will require skilled labor in replacing the filter units. The substitution of fresh filter units for spent filter units may be made by ordinary workmen and the filter units may be cleaned, refilled and/or sterilized with minimum effort and material.

It will, of course, be understood that various modifications may be made in the apparatus above described without in any way departing from the spirit of the invention as defined in the appended claims.

I claim:

1. A filter comprising a pair of end members including pipe sections, a tubular member connecting said end members, a double wall end cup-shaped member connected to each pipe section, and filtering material arranged between the walls, said walls being perforated.

2. A filter comprising a pair of end members including pipe sections, a tubular member connecting said end members, a pair of filtering units, each unit comprising a cup-shaped member having inner and outer perforated walls, the inner wall being connected to a pipe section, a detachable annular member engaging said walls to form a chamber therewith, and filtering material arranged in said chamber.

3. A filter comprising a pair of end members including pipe sections, a tubular member connecting said end members, a pair of filtering units, each filtering unit comprising a cup-shaped member having inner and outer perforated walls, the inner wall being detachably connected to a pipe section, an annular member threaded on to said inner wall and engaging said outer wall to form a chamber, and filtering material arranged in said chamber.

4. A filter comprising a pair of end members including pipe sections, a tubular member detachably connected to said end members and being movable axially thereof when disconnected, a pair of filtering units, each filtering unit comprising a cup-shaped member having inner and outer perforated walls, the inner wall being connected to a pipe section, a detachable annular member engaging said walls to form a chamber therewith, and filtering material arranged in said chamber.

5. A filter comprising a pair of end members including pipe sections, a tubular member having a flange at one end engaging one of said end members, an annular member engaging said other end member and being detachably connected to the latter end of said tubular member, a pair of filtering units, each unit comprising a cup-shaped member having inner and outer perforated walls, the inner wall being detachably connected to a pipe section, an annular member threaded on to said inner wall and engaging said outer wall to form a chamber, and filtering material arranged within said chamber.

6. A filter comprising a pair of end members including pipe sections, a tubular member having a flange at one end engaging one of said end members, an annular member engaging said other end member and being detachably connected to the latter end of said tubular member, a pair of filtering units, each unit comprising a cup-shaped member having inner and outer perforated walls, the inner wall projecting beyond the outer wall and being threaded onto a pipe section, an annular member threaded on to said inner wall and engaging the rim of the outer wall to form a chamber, and filtering material arranged in said chamber.

In testimony whereof, I have signed my name to this specification.

EDWARD B. SISSON.